US012756305B2

(12) United States Patent
Wu et al.

(10) Patent No.: US 12,756,305 B2
(45) Date of Patent: Oct. 6, 2026

(54) ELECTRONIC APPARATUS AND OPERATION METHOD THEREOF HAVING A LOW POWER WAKE-UP MECHANISM

(71) Applicant: REALTEK SEMICONDUCTOR CORPORATION, Hsinchu (TW)

(72) Inventors: Tsung-Hsuan Wu, Hsinchu (TW); Ching-Sheng Cheng, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 105 days.

(21) Appl. No.: 18/780,580

(22) Filed: Jul. 23, 2024

(65) Prior Publication Data

US 2026/0031722 A1 Jan. 29, 2026

(30) Foreign Application Priority Data

Jul. 27, 2023 (TW) ................................ 112128191

(51) Int. Cl.
*H02M 3/04* (2006.01)

(52) U.S. Cl.
CPC .................................... *H02M 3/04* (2013.01)

(58) Field of Classification Search
CPC ...................................................... H02M 3/04
USPC ......................................................... 713/320
See application file for complete search history.

(56) References Cited

U.S. PATENT DOCUMENTS 6,141,719 A * 10/2000 Rafferty ............. G06F 13/4022 710/316
6,308,215 B1 * 10/2001 Kolbet ............... G06F 13/4045 710/316
7,024,501 B1 * 4/2006 Wright ................. A63F 13/843 710/36
7,197,578 B1 * 3/2007 Jacobs ................. G06F 1/3253 710/305
8,188,764 B2 5/2012 Weiss et al.
10,282,313 B2 5/2019 Ghosh et al.

(Continued)

FOREIGN PATENT DOCUMENTS

CN 107491159 A 12/2017
TW 201203933 A 1/2012
TW 202105123 A 2/2021

OTHER PUBLICATIONS

Universal Serial Bus Specification Revision 2.0 Apr. 27, 2000 (Year: 2000).*

(Continued)

*Primary Examiner* — Paul R. Myers
(74) *Attorney, Agent, or Firm* — WPAT, PC

(57) ABSTRACT

The present disclosure discloses an electronic apparatus having low power wake-up mechanism that includes an upper layer circuit and a physical layer. The upper layer circuit is powered off in a sleep state. The physical layer wakes up the upper layer circuit in the sleep state according to a logic state transition event that switches a pair of differential signal lines of a USB interface from a sleep logic state to a wakeup logic state such that a power of the upper layer circuit is restored. The physical layer modifies a voltage state of the differential signal lines to drive a host apparatus to detect a pull-out event and a plug-in event in series. The physical layer controls the upper layer circuit to perform initialization and enumeration process with the host apparatus to reconnect with the host apparatus.

18 Claims, 3 Drawing Sheets

(56) References Cited

U.S. PATENT DOCUMENTS

| | | | | | |
|---|---|---|---|---|---|
| 10,866,627 | B2 | 12/2020 | Agarwal et al. | | |
| 2002/0169915 | A1 * | 11/2002 | Wu | G06F 13/4081 | 710/305 |
| 2003/0104836 | A1 * | 6/2003 | Shinohara | H04W 52/0267 | 455/559 |
| 2003/0115400 | A1 * | 6/2003 | Hoshino | G06F 13/4081 | 710/305 |
| 2005/0097403 | A1 * | 5/2005 | Chen | G06F 11/221 | 702/122 |
| 2006/0075271 | A1 * | 4/2006 | Lilja | G06F 1/3203 | 713/322 |
| 2006/0076977 | A1 * | 4/2006 | Zhu | G06F 13/4081 | 326/86 |
| 2006/0097753 | A1 * | 5/2006 | Shibata | H04L 25/0276 | 326/83 |
| 2006/0161793 | A1 * | 7/2006 | Orr | G06F 1/325 | 713/300 |
| 2008/0215765 | A1 * | 9/2008 | Butler | G06F 1/3253 | 710/15 |
| 2009/0210734 | A1 * | 8/2009 | Schramm | G06F 13/385 | 713/324 |
| 2009/0265722 | A1 * | 10/2009 | Lu | G06F 13/387 | 719/327 |
| 2010/0238836 | A1 * | 9/2010 | Diab | H04W 40/02 | 370/254 |
| 2012/0117293 | A1 * | 5/2012 | Salamon | H04L 12/2832 | 710/313 |
| 2012/0204043 | A1 * | 8/2012 | Hamasaki | G06F 1/3287 | 713/320 |
| 2013/0094416 | A1 * | 4/2013 | Ling | H04L 12/2801 | 375/222 |
| 2013/0145186 | A1 * | 6/2013 | Chu | G06F 13/426 | 713/310 |
| 2013/0145191 | A1 * | 6/2013 | Hung | G06F 1/329 | 713/323 |
| 2014/0065967 | A1 * | 3/2014 | Shen | H04W 88/04 | 455/41.2 |
| 2014/0101345 | A1 * | 4/2014 | Ranta | G06F 13/4081 | 710/16 |
| 2015/0156115 | A1 * | 6/2015 | Buyukkoc | H04W 4/08 | 709/223 |
| 2015/0205339 | A1 * | 7/2015 | Park | G06F 1/3278 | 713/323 |
| 2015/0286264 | A1 * | 10/2015 | Qi | G06F 1/3278 | 713/320 |
| 2018/0155960 | A1 * | 6/2018 | Lowe | E05B 47/0607 | |

OTHER PUBLICATIONS

Jon Lueker et al., USB 2.0 Transceiver Macrocell Interface (UTMI) Specification, Mar. 29, 2001, 1999-2001 Intel Corporation.

OA letter of a counterpart TW application (U.S. Appl. No. 10/282,313) mailed on Jun. 21, 2024. Summary of the TW OA letter: 1. Claims 1-3, 7 and 10 are rejected as allegedly being unpatentable in view of cited reference 1 (CN107491159A, also published as U.S. Appl. No. 10/282,313B2) and cited reference 2 (TW 201203933 A, also published as U.S. Pat. No. 8,188,764B2) and cited reference 3 (TW 202105123 A, also published as U.S. Appl. No. 10/282,313B2). 2. Claims 4-6 and 8-9 are allowable. Correspondence bewteen claims of TW counterpart application and claims of US application: 1. Claims 1, 2-3, . . . , and 10 in TW counterpart application correspond to claims 1, 2-3, . . . 9 and 11 in US application, respectively.

* cited by examiner

ELECTRONIC APPARATUS AND OPERATION METHOD THEREOF HAVING A LOW POWER WAKE-UP MECHANISM

BACKGROUND OF THE INVENTION

1. Field of the Invention

The present disclosure relates to an electronic apparatus and an operation method thereof having a low power wake-up mechanism.

2. Description of Related Art

Universal serial bus (USB) is a serial bus standard that connects a host and a peripheral apparatus such that the host communicates with the peripheral apparatus through such a bus. In order to save power, the host and the peripheral apparatus that the USB bus connects enter a sleep state when the host and the peripheral apparatus are not in operation. Once an event occurs on the USB bus, the host or the peripheral apparatus can be waked up accordingly.

When the peripheral apparatus is scheduled to enter the sleep state, an upper layer circuit therein includes a power-off area and a power-on area to allow the power-on area to store pervious state information before the power is off and stop supplying power to the power-off area in order to enter the sleep state. After being waked up, the upper layer circuit having the power restored can quickly reconnect with the host according to the state information stored in the power-on area. However, such a design forces the peripheral apparatus to keep high power consumption in the sleep state due to the presence of the power-on area, which is not beneficial to power-saving.

SUMMARY OF THE INVENTION

In consideration of the problem of the prior art, an object of the present disclosure is to provide an electronic apparatus and an operation method thereof having a low power wake-up mechanism.

The present invention discloses an electronic apparatus having a low power wake-up mechanism that includes an upper layer and a physical layer circuit. The upper layer circuit is configured to be powered off in a sleep state. The physical layer circuit is configured to wake up the upper layer circuit in the sleep state according to a logic state transition event that indicates a pair of differential signal lines of a Universal Serial Bus (USB) interface transiting from a sleep logic state to a wake-up logic state, such that a power of the upper layer circuit is restored, wherein the pair of differential signal lines electrically couple the physical layer circuit to a host apparatus, modify a voltage state of the pair of differential signal lines to drive the host apparatus to detect a pull-out event and a plug-in event in a sequential order and control the upper layer circuit to perform an initialization and enumeration process with the host apparatus to reconnect with the host apparatus.

The present invention also discloses an electronic apparatus operation method having a low power wake-up mechanism used in an electronic apparatus. The electronic apparatus operation method includes steps outlined below. An upper layer circuit is powered off in a sleep state. The upper layer circuit is waked up in the sleep state by a physical layer circuit according to a logic state transition event that indicates a pair of differential signal lines of a Universal Serial Bus interface transiting from a sleep logic state to a wakeup logic state, such that a power of the upper layer circuit is restored, wherein the pair of differential signal lines electrically couple the physical layer circuit to a host apparatus. A voltage state of the pair of differential signal lines is modified by the physical layer circuit to drive the host apparatus to detect a pull-out event and a plug-in event in a sequential order. The upper layer circuit is controlled by the physical layer circuit to perform an initialization and enumeration process with the host apparatus to reconnect with the host apparatus.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an electronic apparatus and an operation method thereof having a low power wake-up mechanism to wake up an upper layer circuit in the sleep state according to a logic state transition event of differential signal lines to power the upper layer circuit and drive the host apparatus by modifying a voltage state of the differential signal lines to detect a pull-out event and a plug-in event in a sequential order such that the upper layer circuit performs an initialization and enumeration process with the host apparatus to reconnect with the host apparatus.

Figure 1:
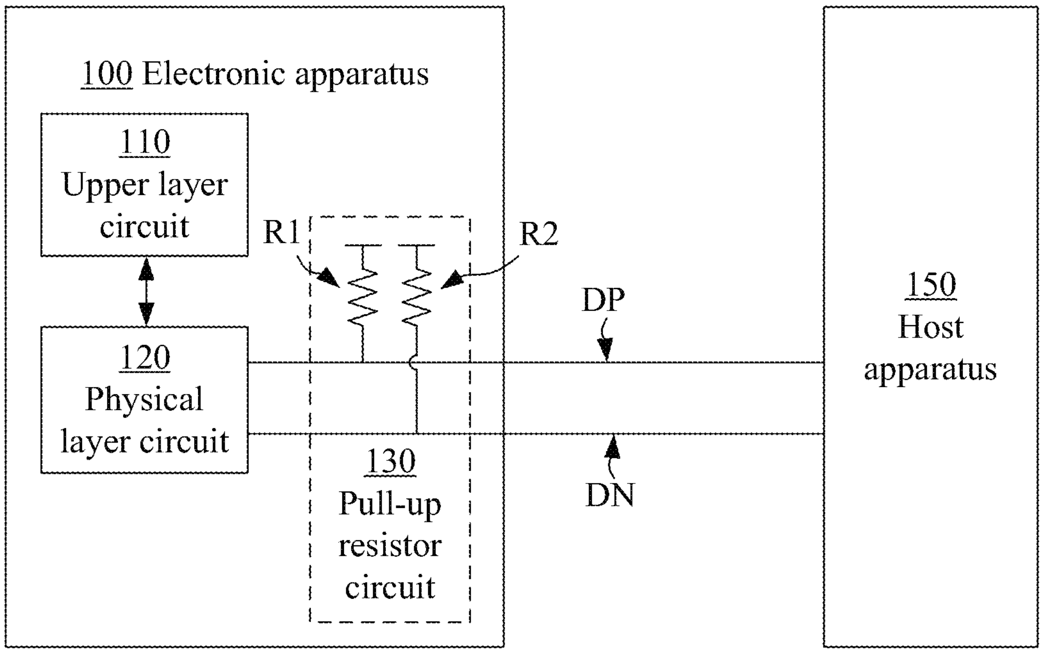
FIG. 1 illustrates a block diagram of an electronic apparatus having a low power wake-up mechanism and a host apparatus that the electronic apparatus is electrically coupled to according to an embodiment of the present invention.

Reference is now made to FIG. 1. FIG. 1 illustrates a block diagram of an electronic apparatus 100 having a low power wake-up mechanism and a host apparatus 150 that the electronic apparatus 100 is electrically coupled to according to an embodiment of the present invention.

In an embodiment, the electronic apparatus 100 can be such as, but not limited to a mouse, a keyboard or other peripheral electronic apparatus. The electronic apparatus 100 is configured to be electrically coupled to the host apparatus 150 and interact with the host apparatus 150. In an embodiment, the electronic apparatus 100 is electrically coupled to the host apparatus 150 through Universal Serial Bus (USB) interface.

In general, the Universal Serial Bus interface at least includes a pair of differential signal lines (D+ and D−) and a power line (Vbus). The Universal Serial Bus interface may selectively include such as, but not limited to a ground line and an identification (ID) line. In FIG. 1, the differential signal lines that include a positive signal line DP and a negative signal line DN and are electrically coupled between the electronic apparatus 100 and the host apparatus 150 are exemplarily illustrated.

Each of the electronic apparatus 100 and the host apparatus 150 includes a corresponding connecting port so as to be electrically coupled to each other through the lines described above.

The electronic apparatus 100 includes an upper layer circuit 110 and a physical layer circuit 120.

The upper layer circuit 110 is configured to be powered off in a sleep state. In an embodiment, the upper layer circuit 110 includes a data link layer circuit (not illustrated). The data link layer circuit includes such as, but not limited to a media access control (MAC) layer circuit (not illustrated) and a logical link control (LLC) layer circuit (not illustrated). It is appreciated that the configuration of the upper layer circuit 110 described above is merely an example. The present invention is not limited thereto.

The physical layer circuit 120 is still powered in the sleep state. The physical layer circuit 120 is configured to wake up the upper layer circuit 110 in the sleep state according to a logic state transition event that indicates the pair of differential signal lines transiting from a sleep logic state to a wakeup logic state, such that a power of the upper layer circuit 110 is restored. The pair of differential signal lines electrically couple the physical layer circuit 120 to the host apparatus 150.

In an embodiment, the positive signal line DP of the differential signal lines is at a first logic state and the negative signal line DN of the differential signal lines is at a second logic state in the sleep logic state. The positive signal line DP is at the second logic state and the negative signal line DN is at the first logic state in the wakeup logic state.

In an embodiment, the first logic state is 1, and the second logic state is 0. More specifically, a "J state" that is represented by (1, 0), where the logic states of the positive signal line DP and the negative signal line DN are respectively a high state and a low state, corresponds to the sleep logic state. A "K state" that is represented by (0, 1), where the logic states of the positive signal line DP and the negative signal line DN are respectively the low state and the high state, corresponds to the wakeup logic state.

The electronic apparatus 100 may have different operations based on the different roles of the electronic apparatus 100.

When the electronic apparatus 100 is an apparatus to be waked up passively, i.e., when the electronic apparatus 100 is configured to be waked up by the host apparatus 150, the host apparatus 150 actively transits the differential signal lines from the sleep logic state to the wakeup logic state.

As a result, the logic state transition event described above occurs when the physical layer circuit 120 passively detects the presence of the host apparatus 150 and controls the logic state of the differential signal lines to transit from the sleep logic state to the wakeup logic state. In an embodiment, the physical layer circuit 120 may immediately controls the upper layer circuit 110 to be powered when the transition of the logic state of the differential signal lines from the sleep logic state to the wake-up logic state is detected.

When the electronic apparatus 100 is an apparatus to wake up another apparatus, i.e., when the electronic apparatus 100 is configured to be wake up the host apparatus 150, the electronic apparatus 100 actively controls the logic state of the differential signal lines to transit from the sleep logic state to the wakeup logic state, such that the host apparatus 150 passively detects the occurrence of the transition.

As a result, the logic state transition event occurs when the physical layer circuit 120 actively controls the logic state of the differential signal lines to transit from the sleep logic state to the wakeup logic state. In an embodiment, a period of time is needed for the host apparatus 150 to detect the occurrence of the transition. As a result, after actively controlling the logic state of the differential signal lines to transit from the sleep logic state to the wakeup logic state, the physical layer circuit 120 waits for a predetermined time period, e.g., 2.5 millisecond, to control the restoring of the power of the upper layer circuit 110.

In an embodiment, the physical layer circuit 120 may wake up the upper layer circuit 110 according to the logic state transition event of only one of the positive signal line DP and the negative signal line DN. Take the condition that the logic state (1, 0) corresponds to the sleep logic state and the logic state (0, 1) corresponds to the wakeup logic state as an example, the physical layer circuit 120 may wake up the upper layer circuit 110 only according to the logic state transition event of the positive signal line DP that transits from the high state (1) to the low state (0), or may wake up the upper layer circuit 110 only according to the logic state transition event of the negative signal line DN that transits from the low state (0) to the high state (1).

In an embodiment, the logic state transition event may occur according to the voltage control performed on the positive signal line DP and the negative signal line DN by an analog driving circuit (not illustrated in the figure) included by the physical layer circuit 120.

The physical layer circuit 120 determines whether the physical layer circuit 120 includes a state storage area configured to store a previous state of the upper layer circuit 110 before the upper layer circuit 110 is powered off. When the physical layer circuit 120 determines that the physical layer circuit 120 does not include the state storage area, the physical layer circuit 120 modifies the voltage state of the differential signal lines to drive the host apparatus 150 to detect a pull-out event and a plug-in event in the sequential order.

In an embodiment, the electronic apparatus 100 further includes a pull-up resistor circuit 130 that is electrically coupled to the differential signal lines in the sleep state and has a first resistive parameter relative to the differential signal lines, such that the differential signal lines have a first voltage state.

The physical layer circuit 120 is configured to control the pull-up resistor circuit 130 to have a second resistive parameter relative to the differential signal lines such that the differential signal lines have a second voltage state to further drive the host apparatus 150 to detect the pull-out event. The physical layer circuit 120 is further configured to control the pull-up resistor circuit 130 to have the first resistive parameter relative to the differential signal lines again such that the differential signal lines have the first voltage state to further drive the host apparatus 150 to detect the plug-in event.

In an example, the pull-up resistor circuit 130 includes a first resistor R1 corresponding to the positive signal line DP and a second resistor R2 corresponding the negative signal line DN. In the sleep state, the first resistor R1 is electrically coupled to the positive signal line DP and the second resistor R2 is electrically coupled to the negative signal line DN. The first resistive parameter includes a first resistance of the first resistor R1 relative to the positive signal line DP and a second resistance of the second resistor R2 relative to the negative signal line DN.

The physical layer circuit 120 is configured to control the pull-up resistor circuit 130 to be electrically disconnected from the differential signal lines such that the differential signal lines have the second voltage state. More specifically, the physical layer circuit 120 controls the first resistor R1 to be electrically disconnected from the positive signal line DP and controls the second resistor R2 to be electrically disconnected from the negative signal line DN. The second resistive parameter includes the first resistance of the first resistor R1 relative to the positive signal line DP and the second resistance of the second resistor R2 relative to the negative signal line DN, where each of the first resistance and the second resistance under such a condition in the present embodiment is 0. The second voltage state of the positive signal line DP and the negative signal line DN drives the host apparatus 150 to detect the pull-out event.

Further, the physical layer circuit 120 is configured to control the pull-up resistor circuit 130 to be electrically coupled to the differential signal lines again such that the differential signal lines have the first voltage state. More specifically, the physical layer circuit 120 controls the first resistor R1 to be electrically coupled to the positive signal line DP again and the second resistor R2 to be electrically coupled to the negative signal line DN again, such that the first resistor R1 and the second resistor R2 have the first resistive parameter relative to the positive signal line DP and the negative signal line DN again. Under such a condition, the first voltage state of the positive signal line DP and the negative signal line DN drives the host apparatus 150 to detect the plug-in event.

When the host apparatus 150 detects the plug-in event, the physical layer circuit 120 performs an initialization and enumeration process with the host apparatus 150 such that the upper layer circuit 110 reconnects with the host apparatus 150. More specifically, after detecting the plug-in event, the host apparatus 150 initiates and performs the initialization and enumeration process with the upper layer circuit 110. After the initialization and enumeration process is finished, the upper layer circuit 110 that is powered again can reconnect with the host apparatus 150.

It is appreciated that in the embodiment described above, the condition that the physical layer circuit 120 modifies the logic state of the differential signal lines and modifies the resistance parameter of the pull-up resistor circuit 130 to further modify the voltage state of the differential signal lines is used as an example to describe a possible implementation to modify the voltage state of the differential signal lines. In other embodiments, the voltage state of the differential signal lines can be modified by using other methods.

Furthermore, in the embodiment described above, the modification of the resistance parameter of the pull-up resistor circuit 130 is used as an example to describe a possible implementation to drive the host apparatus 150 to detect the pull-out event and the plug-in event. In other embodiments, the physical layer circuit 120 may drive the host apparatus 150 to detect the pull-out event and the plug-in event by using other methods.

For example, under the condition that the pull-up resistor circuit stays to be electrically coupled to the differential signal lines, the physical layer circuit 120 may modify the resistance of the pull-up resistor circuit relative to the differential signal lines by electrically coupling the pull-up resistor circuit and other resistor circuits in parallel or in series, or by implementing the pull-up resistor circuit with variable resistors, so as to drive the host apparatus 150 to detect the pull-out event and the plug-in event.

In another example, the physical layer circuit 120 may modify the voltage state of the differential signal lines by using a method unrelated to the pull-up resistor circuit to drive the host apparatus 150 to detect the pull-out event and the plug-in event. The present invention is not limited thereto.

Figure 2:
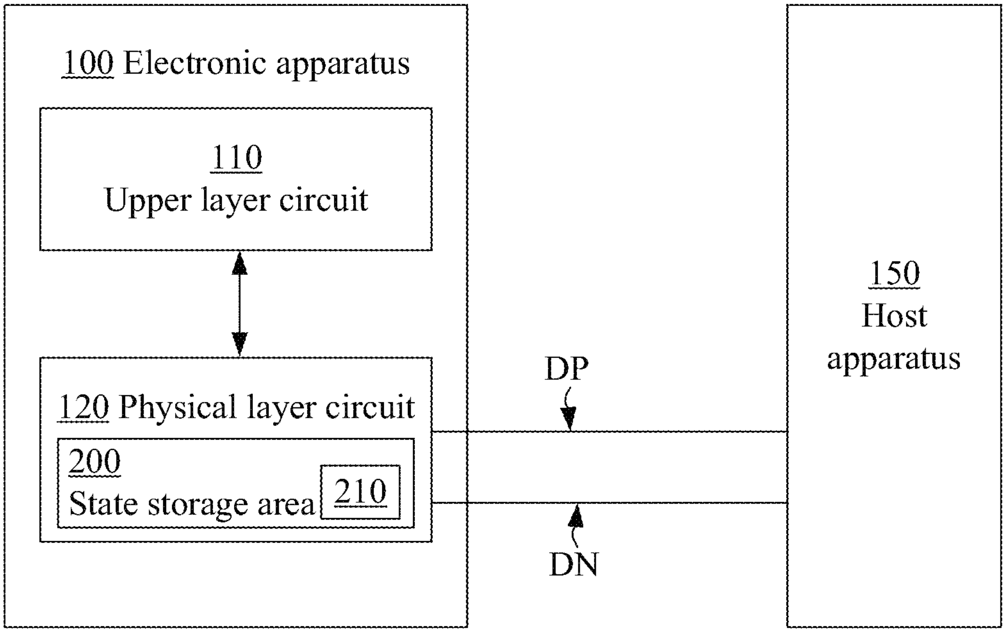
FIG. 2 illustrates a block diagram of the electronic apparatus having the low power wake-up mechanism and the host apparatus that the electronic apparatus is electrically coupled to according to another embodiment of the present invention.

Reference is now made to FIG. 2. FIG. 2 illustrates a block diagram of the electronic apparatus 100 having the low power wake-up mechanism and the host apparatus 150 that the electronic apparatus 100 is electrically coupled to according to another embodiment of the present invention. The relation between the electronic apparatus 100 and the host apparatus 150 in FIG. 2 is identical to that in FIG. 1, and the electronic apparatus 100 also includes the upper layer circuit 110 and the physical layer circuit 120. The identical relation and operation are not further described herein.

In the present embodiment, the physical layer circuit 120 has a state storage area 200 configured to store a previous state 210 of the upper layer circuit 110 before the upper layer circuit is powered off. In an embodiment, the state storage area 200 can be an A-PHY circuit.

As a result, when the physical layer circuit 120 includes the state storage area 200, the physical layer circuit 120 does not modify the voltage state of the differential signal lines and directly controls the upper layer circuit 110 to retrieve previous state 210 from the state storage area 200 to reconnect with the host apparatus 150.

In some approaches, in order to quickly allow the upper layer circuit to reconnect with the host apparatus, the upper layer circuit needs to includes a power-on area that is not powered off in the sleep state to store the previous state of the upper layer circuit before the upper layer circuit is powered off for the upper layer circuit that is powered again to access. However, such a design forces the electronic apparatus to keep high power consumption in the sleep state, which is not beneficial to power-saving.

As a result, the electronic apparatus having the low power wake-up mechanism wakes up the upper layer circuit in the sleep state according to the logic state transition event of the differential signal lines to power the upper layer circuit and drive the host apparatus by modifying the voltage state of the differential signal lines to detect the pull-out event and the plug-in event in the sequential order such that the upper layer circuit performs an initialization and enumeration process with the host apparatus to reconnect with the host apparatus. Under the condition that no additional storage of the previous state is needed, the upper layer circuit of the electronic apparatus can reconnect with the host apparatus quickly to accomplish the object of power-saving.

Selectively, the electronic apparatus having the low power wake-up mechanism may keep the upper layer circuit having a complex design and being power-consuming to be fully powered off in the sleep state when the physical layer circuit has the state storage area. When being waked up, the upper layer circuit that is powered again can access the previous state from the state storage area and reconnect with the host apparatus.

Figure 3:
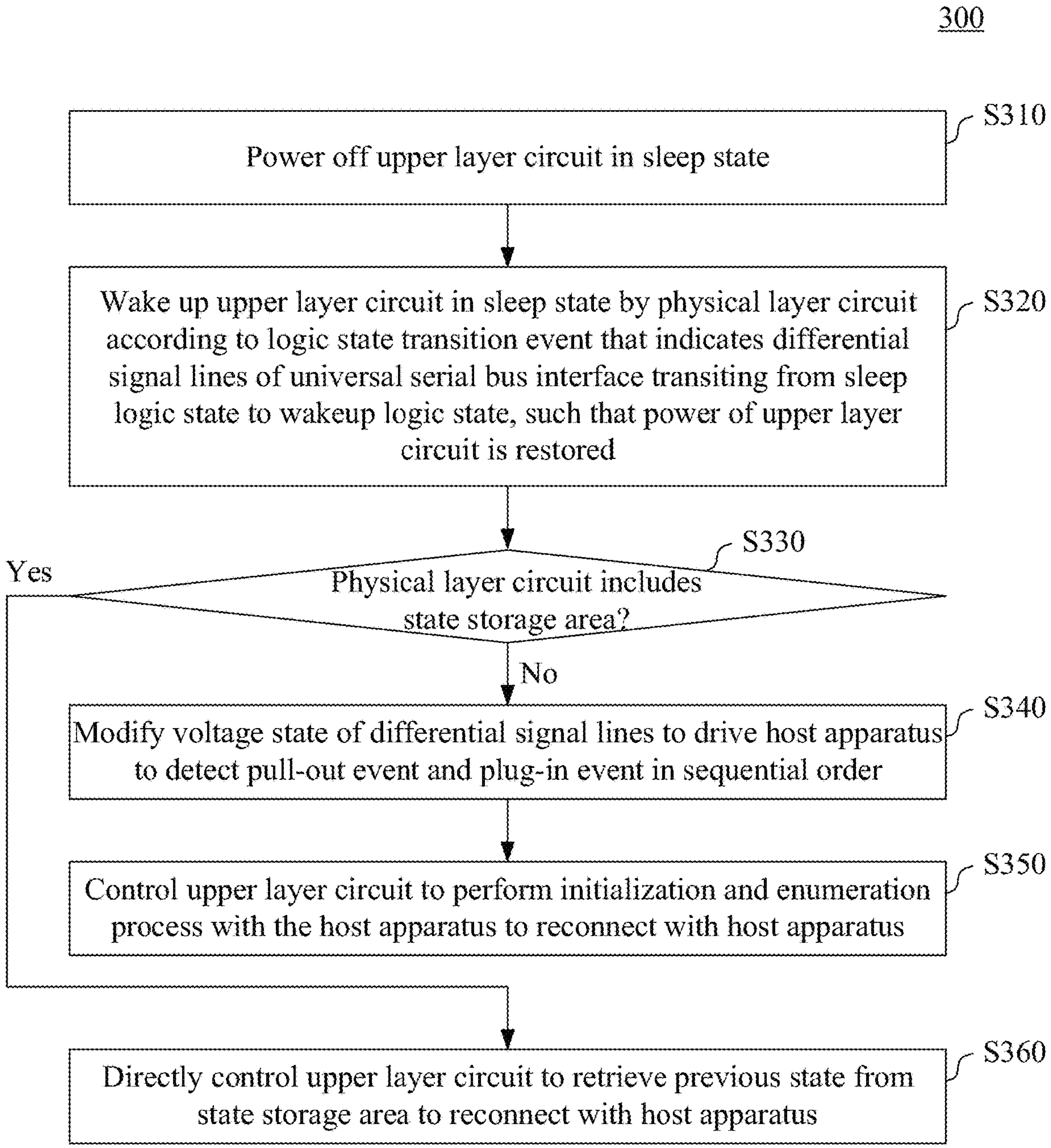
FIG. 3 illustrates a flow chart of an electronic apparatus operation method having a low power wake-up mechanism according to an embodiment of the present invention.

Reference is now made to FIG. 3. FIG. 3 illustrates a flow chart of an electronic apparatus operation method 300 having a low power wake-up mechanism according to an embodiment of the present invention.

Besides the apparatus described above, the present invention further discloses the electronic apparatus operation method 300 that can be used in such as, but not limited to the electronic apparatus 100 illustrated in FIG. 1. An embodiment of the electronic apparatus operation method 300 is illustrated in FIG. 3 and includes the steps outlined below.

In step S310, the upper layer circuit 110 is powered off in the sleep state.

In step S320, the upper layer circuit 110 is waked up in the sleep state by the physical layer circuit 120 according to the logic state transition event that indicates the differential signal lines of the Universal Serial Bus interface transiting from the sleep logic state to the wakeup logic state, such that a power of the upper layer circuit 110 is restored, wherein the differential signal lines electrically couple the physical layer circuit 120 to the host apparatus 150.

In step S330, the physical layer circuit 120 determines whether the physical layer circuit 120 includes the state storage area configured to store the previous state of the upper layer circuit 110 before the upper layer circuit 110 is powered off.

In step S340, when the physical layer circuit 120 does not include the state storage area, the physical layer circuit 120 modifies the voltage state of the differential signal lines to drive the host apparatus 150 to detect the pull-out event and the plug-in event in the sequential order.

In step S350, the upper layer circuit 110 performs the initialization and enumeration process with the host apparatus 150 to reconnect with the host apparatus 150.

In step S360, when the physical layer circuit 120 includes the state storage area, e.g., the state storage area 200 illustrated in FIG. 2, the physical layer circuit 120 directly controls the upper layer circuit 110 to retrieve the previous state 210 from the state storage area 200 to reconnect with the host apparatus 150.

It is appreciated that the embodiments described above are merely an example. In other embodiments, it is appreciated that many modifications and changes may be made by those of ordinary skill in the art without departing, from the spirit of the invention.

In summary, the electronic apparatus and the operation method thereof having a low power wake-up mechanism wake up an upper layer circuit in the sleep state according to a logic state transition event of differential signal lines to power the upper layer circuit and drive the host apparatus by modifying a voltage state of the differential signal lines to detect a pull-out event and a plug-in event in a sequential order such that the upper layer circuit performs an initialization and enumeration process with the host apparatus to reconnect with the host apparatus.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An electronic apparatus having a low power wake-up mechanism, comprising:

an upper layer configured to be powered off in a sleep state; and a physical layer circuit configured to:

wake up the upper layer circuit in the sleep state according to a logic state transition event that indicates a pair of differential signal lines of a Universal Serial Bus (USB) interface transiting from a sleep logic state to a wakeup logic state, such that a power of the upper layer circuit is restored, wherein the pair of differential signal lines electrically couple the physical layer circuit to a host apparatus;

determines whether the physical layer circuit comprises a state storage area configured to store a previous state of the upper layer circuit before the upper layer circuit is powered off;

modify a voltage state of the pair of differential signal lines to drive the host apparatus to detect a pull-out event and a plug-in event in a sequential order when the physical layer circuit does not comprise the state storage area; and control the upper layer circuit to perform an initialization and enumeration process with the host apparatus to reconnect with the host apparatus; and not modify the voltage state of the pair of differential signal lines when the physical layer circuit comprises the state storage area and directly control the upper layer circuit to retrieve the previous state of the upper layer circuit from the state storage area to reconnect with the host apparatus.

2. The electronic apparatus of claim 1, wherein the logic state transition event occurs when the physical layer circuit passively detects the presence of the host apparatus and controls the logic state of the pair of differential signal lines to transit from the sleep logic state to the wakeup logic state.

3. The electronic apparatus of claim 1, wherein the logic state transition event occurs when the physical layer circuit actively controls the logic state of the pair of differential signal lines to transit from the sleep logic state to the wakeup logic state.

4. The electronic apparatus of claim 1, further comprising a pull-up resistor circuit that is electrically coupled to the pair of differential signal lines in the sleep state and has a first resistive parameter relative to the pair of differential signal lines, such that the pair of differential signal lines have a first voltage state;

wherein the physical layer circuit is configured to control the pull-up resistor circuit to have a second resistive parameter relative to the pair of differential signal lines such that the pair of differential signal lines have a second voltage state to further drive the host apparatus to detect the pull-out event; and the physical layer circuit is configured to control the pull-up resistor circuit to have the first resistive parameter relative to the pair of differential signal lines again such that the pair of differential signal lines have the first voltage state to further drive the host apparatus to detect the plug-in event.

5. The electronic apparatus of claim 4, wherein the physical layer circuit is configured to control the pull-up resistor circuit to be electrically disconnected from the pair of differential signal lines such that the pair of differential signal lines have the second voltage state, and control the pull-up resistor circuit to be electrically coupled to the pair of differential signal lines again such that the pair of differential signal lines have the first voltage state.

6. The electronic apparatus of claim 4, wherein the pair of differential signal lines comprise a positive signal line and a negative signal line, the pull-up resistor circuit comprises a first resistor corresponding to the positive signal line and a second resistor corresponding to the negative signal line, each of the first resistive parameter and the second resistive parameter comprises a first resistance of the first resistor relative to the positive signal line and a second resistance of the second resistor relative to the negative signal line.

7. The electronic apparatus of claim 1, wherein the pair of differential signal lines comprise a positive signal line and a negative signal line;

the positive signal line is at a first logic state and the negative signal line is at a second logic state in the sleep logic state; and the positive signal line is at the second logic state and the negative signal line is at the first logic state in the wakeup logic state.

8. The electronic apparatus of claim 7, wherein the physical layer circuit wakes up the upper layer circuit according to the logic state transition event of only one of the positive signal line and the negative signal line.

9. The electronic apparatus of claim 1, wherein the upper layer circuit at least comprises a media access control layer (MAC) circuit.

10. An electronic apparatus operation method having a low power wake-up mechanism used in an electronic apparatus, comprising:

powering off an upper layer circuit in a sleep state;

waking up the upper layer circuit in the sleep state by a physical layer circuit according to a logic state transition event that indicates a pair of differential signal lines of a Universal Serial Bus interface transiting from a sleep logic state to a wakeup logic state, such that a power of the upper layer circuit is restored, wherein the pair of differential signal lines electrically couple the physical layer circuit to a host apparatus;

determining, by the physical layer circuit, whether the physical layer circuit comprises a state storage area configured to store a previous state of the upper layer circuit before the upper layer circuit is powered off;

modifying a voltage state of the pair of differential signal lines by the physical layer circuit to drive the host apparatus to detect a pull-out event and a plug-in event in a sequential order when the physical layer circuit does not comprise the state storage area; and controlling the upper layer circuit by the physical layer circuit to perform an initialization and enumeration process with the host apparatus to reconnect with the host apparatus; and not modifying the voltage state of the pair of differential signal lines when the physical layer circuit comprises the state storage area and directly controlling the upper layer circuit to retrieve the previous state of the upper layer circuit from the state storage area by the physical layer circuit to reconnect with the host apparatus.

11. The electronic apparatus operation method of claim 10, wherein the logic state transition event occurs when the physical layer circuit passively detects the presence of the host apparatus and controls the logic state of the pair of differential signal lines to transit from the sleep logic state to the wakeup logic state.

12. The electronic apparatus operation method of claim 10, wherein the logic state transition event occurs when the physical layer circuit actively controls the logic state of the pair of differential signal lines to transit from the sleep logic state to the wakeup logic state.

13. The electronic apparatus operation method of claim 10, wherein the electronic apparatus further comprises a pull-up resistor circuit that is electrically coupled to the pair of differential signal lines in the sleep state and has a first resistive parameter relative to the pair of differential signal lines, such that the pair of differential signal lines have a first voltage state, the electronic apparatus operation method further comprising:

controlling the pull-up resistor circuit to have a second resistive parameter relative to the pair of differential signal lines by the physical layer circuit such that the pair of differential signal lines have a second voltage state to further drive the host apparatus to detect the pull-out event; and controlling the pull-up resistor circuit to have the first resistive parameter relative to the pair of differential signal lines again by the physical layer circuit such that the pair of differential signal lines have the first voltage state to further drive the host apparatus to detect the plug-in event.

14. The electronic apparatus operation method of claim 13, wherein the physical layer circuit is configured to control the pull-up resistor circuit to be electrically disconnected from the pair of differential signal lines such that the pair of differential signal lines have the second voltage state, and control the pull-up resistor circuit to be electrically coupled to the pair of differential signal lines again such that the pair of differential signal lines have the first voltage state.

15. The electronic apparatus operation method of claim 13, wherein the pair of differential signal lines comprise a positive signal line and a negative signal line, the pull-up resistor circuit comprises a first resistor corresponding to the positive signal line and a second resistor corresponding to the negative signal line, each of the first resistive parameter and the second resistive parameter comprises a first resistance of the first resistor relative to the positive signal line and a second resistance of the second resistor relative to the negative signal line.

16. The electronic apparatus operation method of claim 10, wherein the pair of differential signal lines comprise a positive signal line and a negative signal line;

the positive signal line is at a first logic state and the negative signal line is at a second logic state in the sleep logic state; and the positive signal line is at the second logic state and the negative signal line is at the first logic state in the wakeup logic state.

17. The electronic apparatus operation method of claim 16, further comprising:

waking up the upper layer circuit by the physical layer circuit according to the logic state transition event of only one of the positive signal line and the negative signal line.

18. The electronic apparatus operation method of claim 10, wherein the upper layer circuit at least comprises a media access control layer circuit.

* * * * *